March 23, 1948.  H. J. HORN  2,438,284
VEHICLE WHEEL
Filed Oct. 14, 1943  2 Sheets-Sheet 1
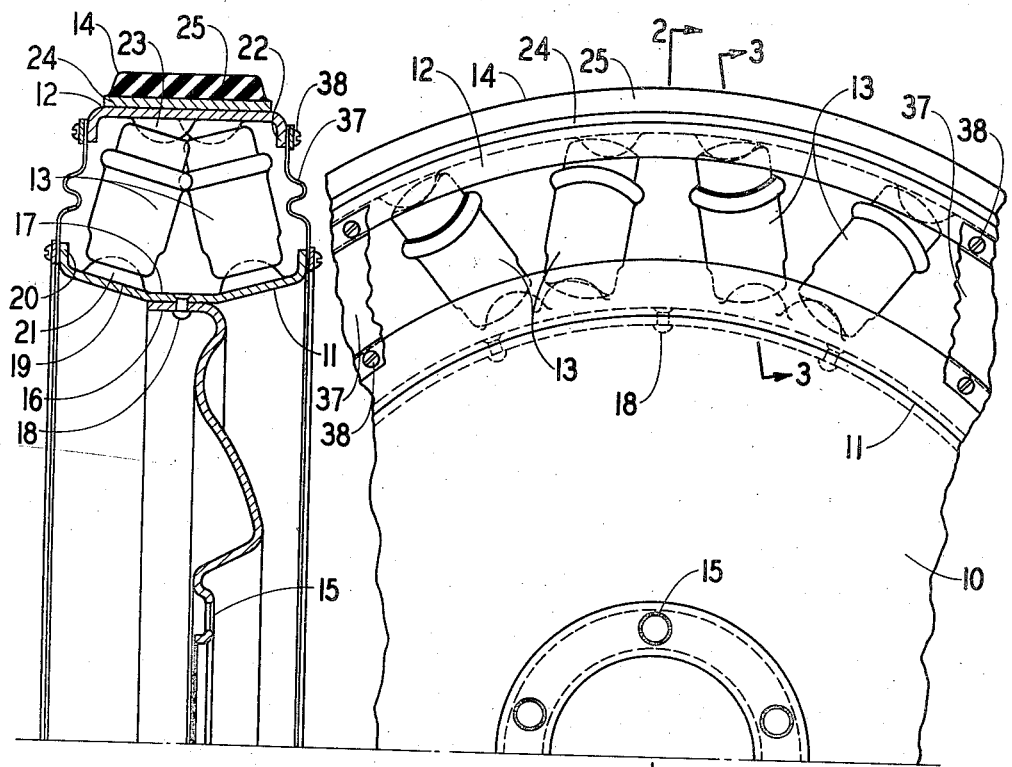
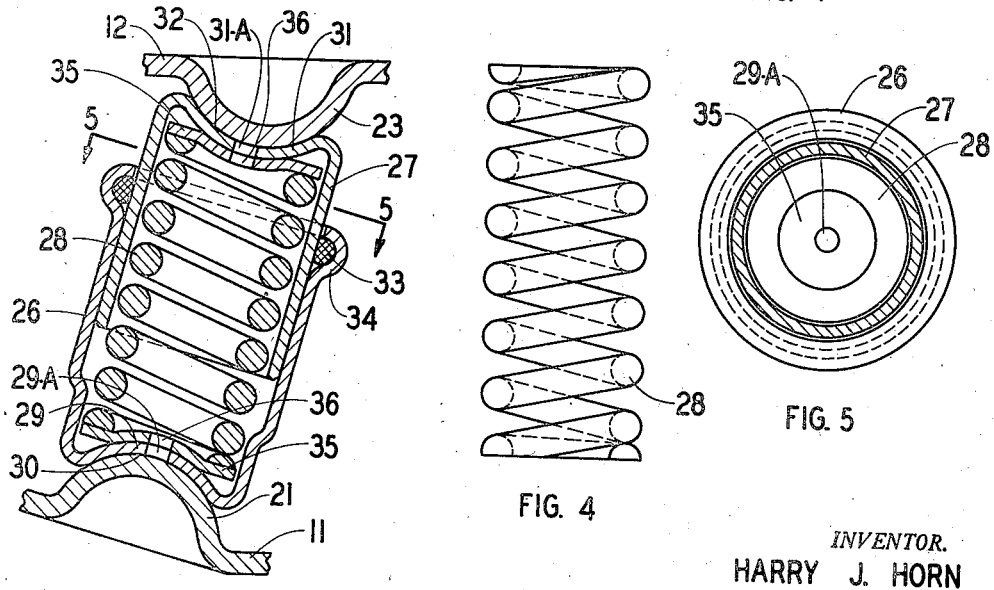
INVENTOR.
HARRY J. HORN

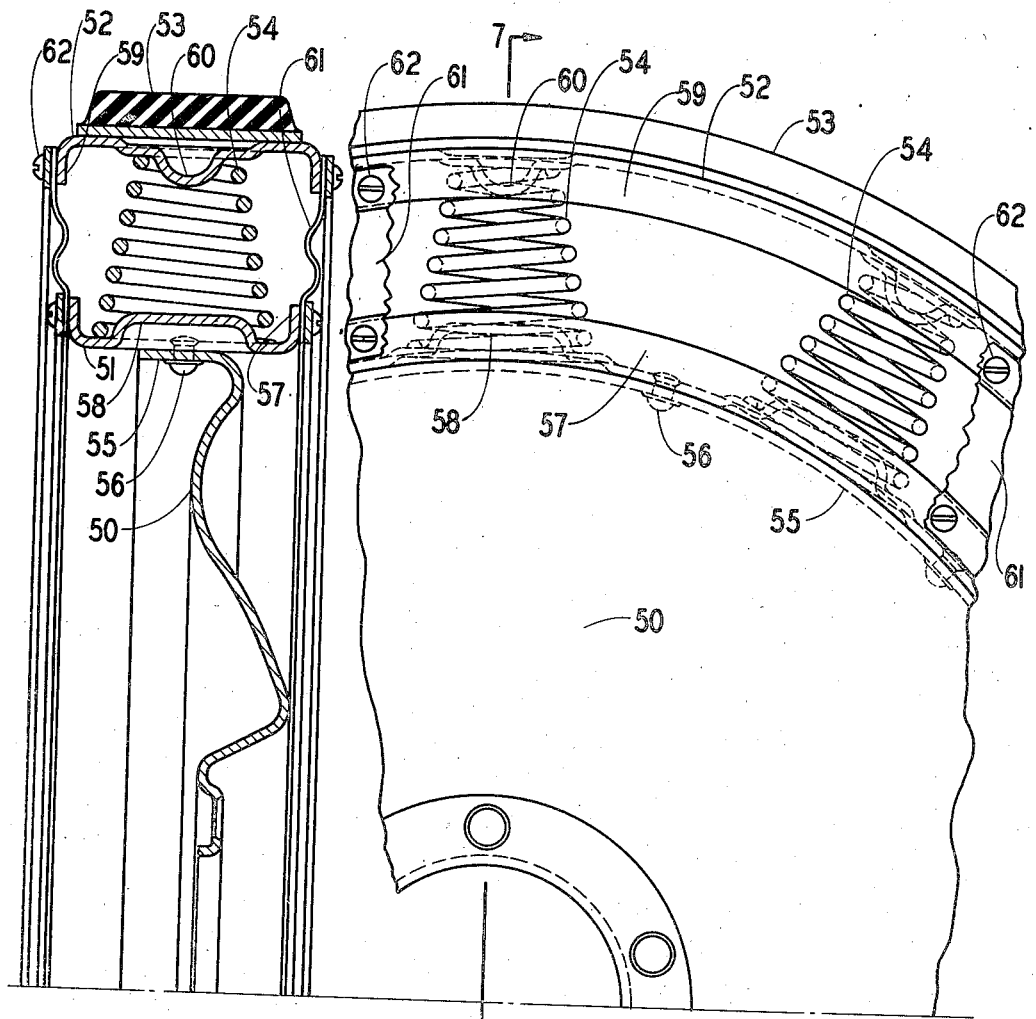

Patented Mar. 23, 1948

2,438,284

UNITED STATES PATENT OFFICE 2,438,284

VEHICLE WHEEL

Harry J. Horn, Lansing, Mich., assignor to Motor Wheel Corporation, Lansing, Mich., a corporation of Michigan Application October 14, 1943, Serial No. 506,163

5 Claims. (Cl. 152—99)

This invention relates to vehicle wheels and more particularly to resilient wheels.

The principal object of the invention is to provide a novel form of resilient wheel whereby pneumatic tires can be dispensed with.

Another object of the invention is to provide a resilient wheel having radially inner and outer spaced apart annuli and a plurality of spring units between the annuli forming the sole operative connection between the latter.

A still further object is to provide a resilient wheel comprising a pair of spaced concentric annuli and a plurality of spring units arranged between the annuli in such a way as to permit relative movement of the annuli yet prevent complete separation of the outer annulus from the wheel.

A still further object of the invention is to provide a novel form of spring unit and connection between the spring unit and the respective annuli.

A still further object is to provide a resilient wheel comprising a pair of spaced concentric annuli and a plurality of spring units arranged to yieldingly resist circumferential and axial movement of the two annuli.

These objects of the invention will more fully appear in the specification when read in connection with the accompanying drawings, wherein—

Figure 1 is a fragmentary elevational view of a wheel embodying the present invention;

Figure 2 is a cross-sectional view taken on substantially the line 2—2 of Figure 1;

Figure 3 is a fragmentary cross-sectional view taken on substantially the line 3—3 of Figure 1;

Figure 4 is a side elevational view of a coiled spring for use with the invention;

Figure 5 is a cross-sectional view taken on subtantially the line 5—5 of Figure 3;

Figure 6 is a fragmentary elevational view of a modified form of the invention; and Figure 7 is a cross-sectional view taken on substantially the line 7—7 of Figure 6.

Figures 1 to 5 disclose one form of the invention. In general the wheel shown in these figures comprises a wheel body 10, inner and outer spaced apart annular rim members 11 and 12 respectively, a plurality of spring units 13, and a tire 14.

The wheel body 10 is a pressed sheet metal member of more or less conventional form adapted to be removably attached in the usual way to a hub, not shown, by bolts or cap screws, not shown, extending through openings 15. The outer perimeter of the wheel body 10 is bent axially to form a peripheral flange 16.

The radially inner rim member 11 is an annulus of sheet metal having a cylindrical central portion 17 telescoping over the flange 16 and riveted thereto by rivets 18. Portions of the rim member 11 on axially opposite sides of the central portion 17 are flared outwardly, as at 19. The extreme peripheral edges of the rim member 11 are provided with radial flanges 20.

Spaced circumferentially of the rim member and located in the flared portions 19 are a plurality of hemispherical protuberances 21. The protuberances are formed by pressing the metal substantially radially outward. The protuberances 21 at axially opposite sides of the wheel are staggered from each other for a purpose which will presently appear.

The outer rim member 12 is generally cylindrical and is provided at its opposite edges with radially inwardly extending flanges 22. Around the periphery of the outer rim member 12 are a plurality of radially inwardly extending hemispherical protuberances 23 similar to the protuberances 21 previously mentioned. The protuberances 23 are circumferentially spaced apart and axially staggered relative to each other.

The tire 14 comprises a sheet metal hoop 24 to which a hard rubber ring 25 is vulcanized or otherwise secured. The sheet metal hoop 24 is attached to the outer rim member 12 in any conventional manner, as by shrinking the hoop onto the rim.

The spring units 13 are all identical and are shown in Figures 3 to 5. Each spring unit comprises a pair of telescoping tubular members 26 and 27 and a coiled spring 28 enclosed therein. The tubular member 26 is generally cylindrical. It is open at one end and closed at the opposite end by a wall 29. The wall 29 is indented to form a spherical recess 30 to receive one of the protuberances 21 on the rim 11. An aperture 29a is formed centrally of end wall 29.

The tubular member 27 is generally cylindrical. It is open at one end and closed at the other end by wall 31 indented to provide a spherical recess 32. The recess 32 is adapted to receive one of the protuberances 23 on the outer rim member 12. An aperture 31a is formed centrally of end wall 31. The member 27 is slidable within the member 26. In order to prevent dirt and water from entering the telescoping members a packing ring 33 is provided. The ring 33 is seated in an annular bead 34 and engages the outer wall of the tubular member 27.

In order to provide flat seats for the ends of the spring 28 a pair of disk members 35 are provided. The peripheral portions of the two disk members 35 are flat while the central portions are recessed to fit over the spherical portions 29 and 31 respectively. The disk members 35 are provided with apertures 36 which are axially aligned with apertures 29a and 31a in the end walls 29 and 31. The tubular members 26 and 27 contain lubricant which can work through the apertures 29a, 31a and 36 and keep the engaging surfaces of the spherical recesses 30 and 32 and the protuberances 21 and 23 lubricated.

The spring units 13 are arranged between the rim members 11 and 12 in the manner disclosed in Figures 1 to 3. The radially inner ends of the spring units engage the protuberances 21 while the outer ends engage the protuberances 23. The spring units are inclined both axially and circumferentially of the wheel. In other words, each spring unit is inclined relative to a radius of the wheel passing through any point in the respective spring unit. Also each spring unit is inclined to the axis of the wheel. The inclination of the spring units relative to the wheel axis and to the wheel radii passing through the spring units may vary somewhat but preferably is between 15° and 25°. The angles should be great enough so that upon relative circumferential or axial movement of the rim members, the coils of the springs opposing that relative movement will touch each other and the springs thereby become solid, before the above mentioned inclinations become 0°. In other words, even though fully compressed, the spring units cannot pass dead center and aid in the relative circumferential or axial movement of the rim members, but will always oppose that movement.

The springs 28 within the spring units are placed under initial compression of such magnitude that even when the springs on the bottom part of the wheel are compressed to their fullest extent the springs in the upper part of the wheel are still under some compressive stress.

In order to additionally protect the spring units from dust and moisture a pair of flexible rings of canvas or similar material 37 are provided. These rings are connected at their inner and outer peripheries to the flanges 20 and 22 on the rim members 11 and 12 respectively by means of screws 38.

The modification shown in Figures 6 and 7 includes a wheel body 50, inner and outer rim members 51 and 52, a tire 53, and coiled springs 54.

The wheel body 50 is substantially the same as wheel body 10 previously described. It is provided at its periphery with an axial flange 55.

The rim member 51 is generally cylindrical and is riveted to the flange 55 by means of rivets 56. At the edges of the rim member 51 are radial flanges 57. Spaced circumferentially about the rim member 51 are a plurality of protuberances 58, the purpose of which will appear presently.

Rim member 52 is generally cylindrical and has radial flanges 59 at its axial extremities. A plurality of protuberances 60 are spaced about the circumference of the rim member 52.

Tire 53 is substantially the same as tire 14 previously described and is shrunk onto or otherwise secured to the outer rim member 52.

The coiled springs 54 are of generally conical configuration, as will be evident in the drawings. The inner ends of the coiled springs 54 are seated against the protuberances 58 on the inner rim member, while the outer end of the springs 54 are seated over the protuberances 60 on the outer rim member. The axes of the springs 54 are radial.

The springs 54 are placed under initial compression such that when the bottom springs are compressed to their fullest extent the springs at the opposite sides of the wheel are still under some compressive stress. The conical configuration of the springs and the compressive stress under which they are placed prevents such extreme relative circumferential and axial movement between the inner and outer rim members 51 and 52 as to permit their complete separation.

The space between the rim members 51 and 52 is closed, and dust and water are prevented from entering, by means of flexible covers 61 attached to the flanges 57 and 59 by screws 62.

From the foregoing it will be evident that the present invention provides a novel form of resilient wheel in which provision is made for relative movement of the outer rim member and tire relative to the inner rim member in all directions. At the same time, due to the particular construction and arrangement of the springs, complete separation of the outer rim member from the wheel is positively prevented. The spring units and the rim members are easily and economically fabricated. The ends of the spring units and the parts of the rim members which they engage are effectively lubricated. The springs are completely housed against dust and moisture.

The scope of the invention is indicated in the appended claims.

I claim:

1. A vehicle wheel comprising radially spaced concentric rim members, a plurality of coiled compression springs positioned between said rims, the axes of adjacent springs being oppositely inclined to the plane of said wheel, and universal pivotal connections between the ends of said springs and said rims, said springs when fully compressed being greater in length than the radial distance between said pivotal connections whereby excessive lateral stress on one of said springs causes alternate springs to fully compress and act as an unyielding link between said rims which limits the relative lateral displacement of said rims.

2. A vehicle wheel comprising radially spaced concentric rim members, a plurality of coiled compression springs positioned between said rims and spaced circumferentially of said wheel, the axes of adjacent springs being oppositely inclined to each other and inclined to a radius of said wheel passing through said springs, universal pivotal connections between the ends of said springs and said rims, said springs being of such size and arranged so that upon relative circumferential movement of said rims the coils of springs opposing said movement will seat upon each other and cause said springs to become solid before the angle of inclination of said springs becomes zero.

3. A vehicle wheel comprising radially spaced inner and outer concentric rim members, a plurality of coiled compression springs positioned between said rims, said springs being spaced circumferentially about said wheel in axially staggered relationship to each other, the axes of adjacent springs being oppositely inclined to the plane of said wheel and circumferentially inclined to each other, and universal pivotal connections between the ends of said springs and said rims, said springs when fully compressed being greater in length than the radial distance between said pivotal connections whereby when said wheel is subjected to excessive circumferential and lateral stresses, some of said springs are fully compressed so as to provide solid members acting between said rims which limit the relative circumferential and lateral displacement of said rims and provide a positive driving relationship between the inner and outer rim.

4. A vehicle wheel comprising radially spaced inner and outer concentric rim members, and a plurality of coiled compression springs positioned between said rims, said springs being spaced circumferentially about said wheel, the axes of adjacent springs being oppositely inclined circumferentially to each other and to a plane perpendicular to the wheel axis and the axis of each spring being inclined relative to a radius of the wheel passing through the spring, and universal pivotal connections between the ends of said springs and said rims, said springs being of such size and arranged so that upon relative circumferential or axial movement of said rim members the coils of those springs opposing said relative movement will touch each other and cause said springs to become solid before the angles of inclination of said springs above-mentioned become zero whereby the relative circumferential and axial displacement of said rims is limited to the length of said springs when fully compressed.

5. The combination as set forth in claim 4 including a pair of telescoping cylindrical members housing said springs and having an inner diameter slightly greater than the outer diameter of said springs, the opposite ends of said members being closed and shaped to provide said above-mentioned pivotal connections between said springs and said rims.

HARRY J. HORN.

REFERENCES CITED

The following references are of record in the file of this patent:

UNITED STATES PATENTS

| Number | Name | Date |
|---|---|---|
| 794,202 | Tipton | July 11, 1905 |
| 824,892 | Wands | July 3, 1906 |
| 925,305 | Custard | June 15, 1909 |
| 936,924 | Moriarity | Oct. 12, 1909 |
| 1,076,003 | Cook | Oct. 14, 1913 |
| 1,082,380 | White | Dec. 23, 1913 |
| 1,127,790 | Mullen | Feb. 9, 1915 |
| 1,279,284 | Davidson | Sept. 17, 1918 |
| 1,290,113 | Deisenhofer | Jan. 7, 1919 |
| 1,449,039 | Happel | Mar. 20, 1923 |

FOREIGN PATENTS

| Number | Country | Date |
|---|---|---|
| 258,504 | Great Britain | 1926 |
| 318,601 | Germany | 1920 |